(12) United States Patent
Vecherin et al.

(10) Patent No.: US 8,500,365 B1
(45) Date of Patent: Aug. 6, 2013

(54) AUTONOMOUS, ADAPTIVE, CONCEALED FLOOD PROTECTION SYSTEM

(76) Inventors: Sergey Nikolaevich Vecherin, Lebanon, NH (US); Margarita Olegovna Vecherina, Lebanon, NH (US)

( * ) Notice: Subject to any disclaimer, the term of this patent is extended or adjusted under 35 U.S.C. 154(b) by 0 days.

(21) Appl. No.: 13/570,801

(22) Filed: Aug. 9, 2012

(51) Int. Cl.
*E02B 7/02* (2006.01)
*E02B 7/26* (2006.01)

(52) U.S. Cl.
USPC .......................................... 405/115; 405/110

(58) Field of Classification Search
USPC ...................... 405/64, 87, 91, 107, 115, 110
See application file for complete search history.

(56) References Cited

U.S. PATENT DOCUMENTS 4,252,461 A * 2/1981 Colamussi et al. ........... 405/115

* cited by examiner

*Primary Examiner* — Tara M. Pinnock

(57) ABSTRACT

Among all natural disasters, flood is the most frequent and devastating. It can be caused by variety of natural and man-made reasons at any time. Therefore, there is a need for permanent protection of commercial and residential buildings, and infrastructures, against flood. Typical permanent flood protection constructions, e.g., levees, embankments and concrete dams, cannot be used for this purpose because they are expensive and inconvenient for protection of a specific building. Once installed, they permanently block access to the area being protected. The claimed invention is aimed at solving this problem. It offers a reliable flood protection system that is 1) concealed, i.e., appears only when water is present and invisible otherwise, 2) adaptive, i.e., adjusts its height to match the approaching water level, 3) autonomous, i.e., does not require any human actions to enable the protection, and 4) can operate without any power source, such as electricity.

20 Claims, 4 Drawing Sheets

AUTONOMOUS, ADAPTIVE, CONCEALED FLOOD PROTECTION SYSTEM

CROSS-REFERENCE TO RELATED APPLICATION

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Flood is one of the most devastating natural disasters. Despite the enormous costs and efforts needed to eliminate the flood consequences, most residential and commercial buildings, as well as infrastructure (roads, public parks, railroads, etc.), remain unprotected. A traditional way to completely protect a construction from flood is to build a dam around it. However, this solution is impractical for at least two reasons. First, it is very expensive. Second, a dam, once built around a building, will completely eliminate access to/from the building. Temporal water barriers, such as sand bags or a specially designed means, do not solve the problem, either. First, such temporal barriers should be installed right prior or during flood occurrence, that is, when water is raising. Almost always, people do not have time for it under such circumstances, especially, if flood occurs at night. Second, the temporal water barriers are not as reliable and safe as a permanently built dam. Third, it is unknown what height a barrier should be. Thus, there is a need in a permanent flood protection system of buildings and infrastructure that would: 1) not prevent access to a building or even not be visible at all (concealed), 2) be safe and reliable as a concrete dam, 3) not require any human actions to enable the protection (would work autonomously, at day or night, even if nobody is in the building) 4) adjust its height to match the advancing water level (adaptive), and, preferably, 5) not use electricity or any other power source for its operation (for the case when electricity is unavailable during flood). The present invention satisfies all these demands.

BRIEF SUMMARY OF THE INVENTION

The invention discloses a flood protection system that possesses the following features:
1) it is permanently installed; no deployment is necessary;
2) it is absolutely water impermeable;
3) it is concealed, that is, it appears only when water is advancing to a construction being protected and disappears when there is no flood risk;
4) it is adaptive, that is, the height of the dam is automatically adjusted to match the level of advancing water (up to a maximal height determined by a specific dam design);
5) it is autonomous, that is, no human actions are required to enable the protection;
6) it does not require electric or any other power (in the preferable embodiment) to operate.

The general idea of the claimed invention is to use a buoyancy force (in the preferable embodiment) of the floating bar attached to a waterproof flexible material (or, alternatively, flexibly joined plates) to raise a dam from an underground compartment where the dam is permanently stored in the folded condition. The frame of the dam freely unfolds or folds following the floating bar motion up or down, respectively, but it is very stable in the horizontal direction, thus, capable of stopping approaching water.

PRIOR STATE OF ART

Despite an exhaustive search of previously issued patents, both in the United States and abroad, patent applications, technical papers, engineering meeting proceedings, technical forums, and journals of engineering societies, no analogous inventions were found. Specifically, the following patent areas were searched (U.S. classification):
Class 405, Hydraulic and Earth Engineering
   52 Fluid control, treatment, or containment
      80. Flow control
         107 . . . Artificial water barrier (e.g., dam, levee, etc.)
           109 . . . Having impervious core
           110 . . . Hollow or buttressed
           112 . . . Vertical wall buttress
           114 . . . Connectable sections
           115 . . . Flexible
           116 . . . In situ construction

DETAILED DESCRIPTION OF THE INVENTION

Figure 1:
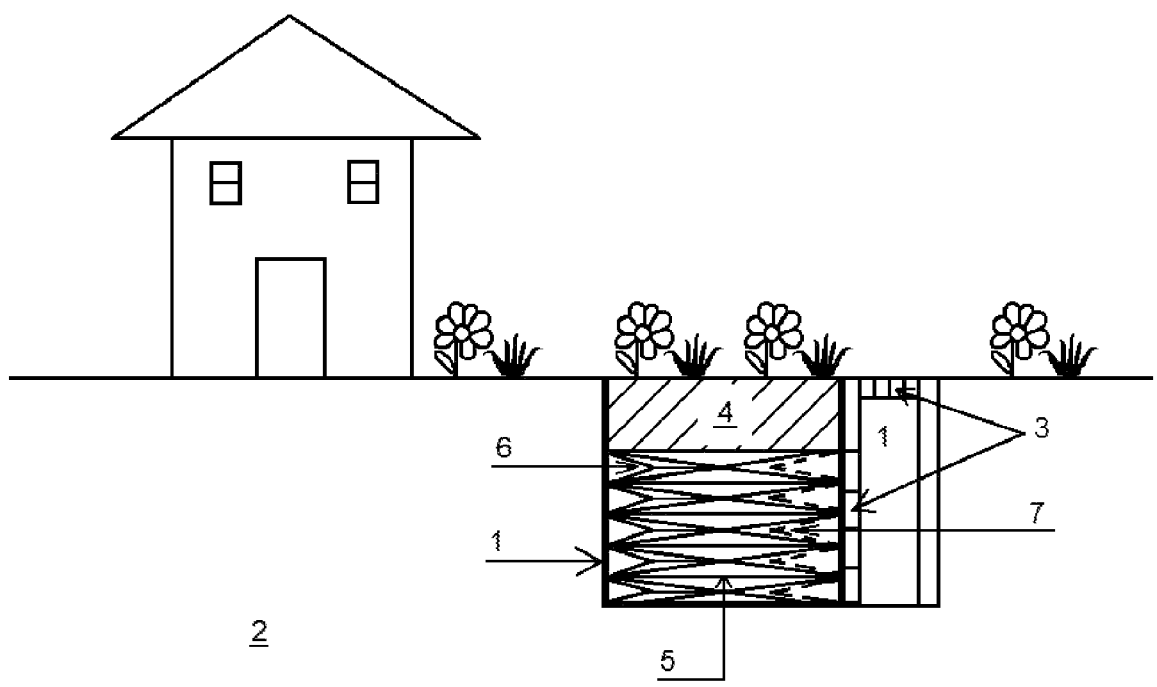
FIG. 1. The preferable embodiment of the claimed flood protection system in the folded state, no flood.
Figure 2:
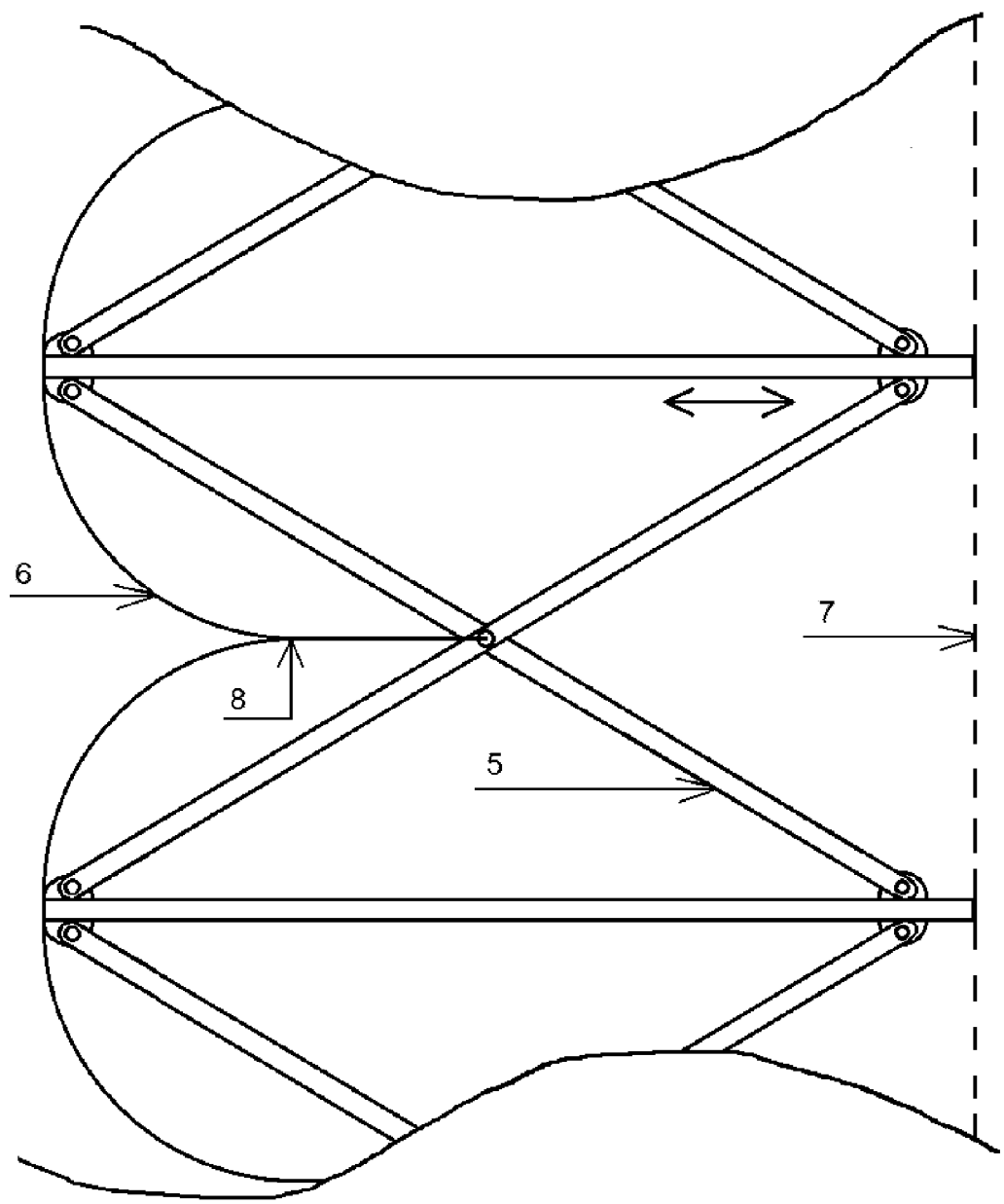
FIG. 2. The structure of the dam in greater details.
Figure 3:
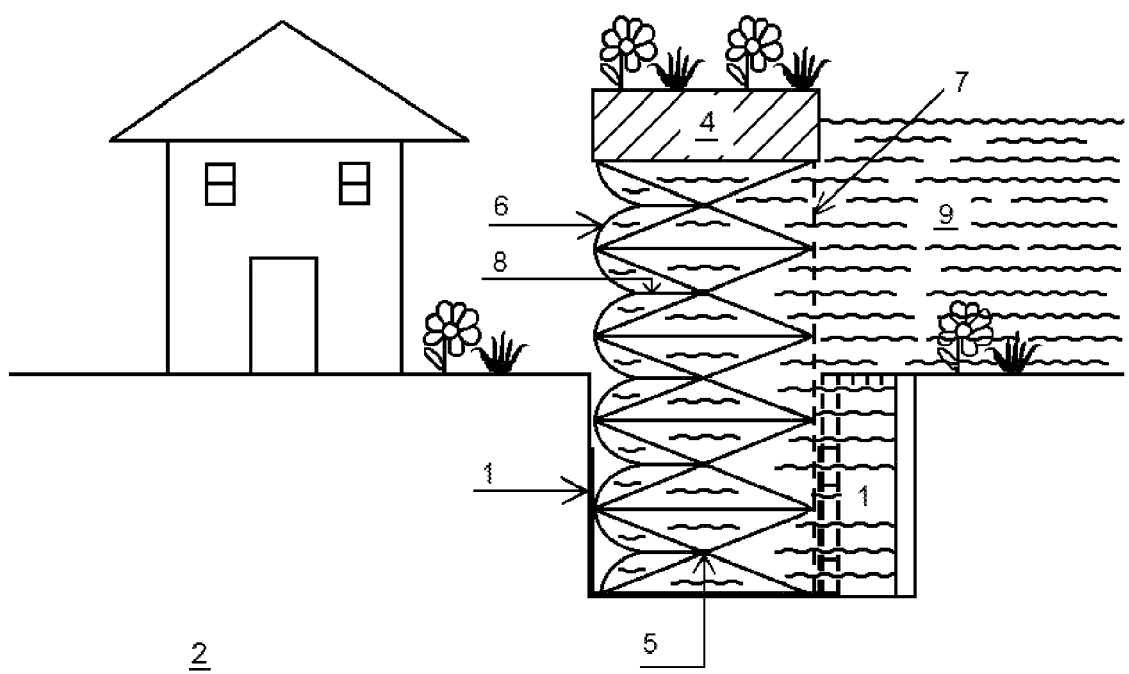
FIG. 3. The preferable embodiment of the claimed flood protection system in the unfolded state illustrating the dam operation during flood. Water is approaching from the right.

The preferable embodiment of the invention is illustrated in FIGS. 1-3. FIG. 1 depicts the dam in the normal (no flood), folded condition. The dam compartment (1) is permanently mounted into the ground (2). The compartment has drainage openings (3) allowing water above the ground freely flaw under the floating bar (4). The floating bar (4) is made of floatable material lighter than water (e.g., wood, synthetic foam, or an air tank) and buried under the slice of soil. Normal loan vegetation can be gardened on the soil. Under the floating bar, the folding frame of the dam (5) with attached flexible impermeable material (6) is situated. Alternatively, the flexible material can be replaced by flexibly joined impermeable plates. The impermeable material (6) is anchored to the bottom of the drainage (1) and to the upper left corner of the floating bar (4). A water permeable material (7) (such as, e.g., a fishing net) is attached to the external (right side, in FIG. 1) side of the dam frame (5). When the system is not in use, the dam remains in the compact, folded condition, as illustrated in FIG. 1.

FIG. 2 shows the dam construction in greater details. The frame (5) is designed to freely move vertically but not horizontally, as shown in FIG. 2. The water permeable material (7) on right plays two roles. First, it filters out the debris that is frequently present in and on flood water. Second, it limits excessive vertical motion of the dam frame. The flexible link (8) serves two purposes, too. First, it does not allow the flexible material (6) expand to the left, beyond the dam width, and, second, it helps to unfold the dam frame by converting horizontal water pressure exerted by water on the flexible material (6) to vertical force.

FIG. 3 shows the system in the unfolded condition when water (9) approaches from the right. Through the openings in the upper part of the drainage (1), water penetrates under the floating bar (4). Since the floating bar is made with a material lighter than water, the buoyancy force drives the bar up, automatically unfolding the waterproof material (6) attached to it. The horizontal force exerted by water to the impermeable material (6) is also converted to vertical force helping to raise the dam via links (8). The higher water level is, the higher the dam. The area to the left of the dam remains protected against the flood. After water disappears, the system returns in its initial condition due to the natural force of gravity.

MODIFICATIONS OF THE PREFERABLE EMBODIMENT

Figure 4:
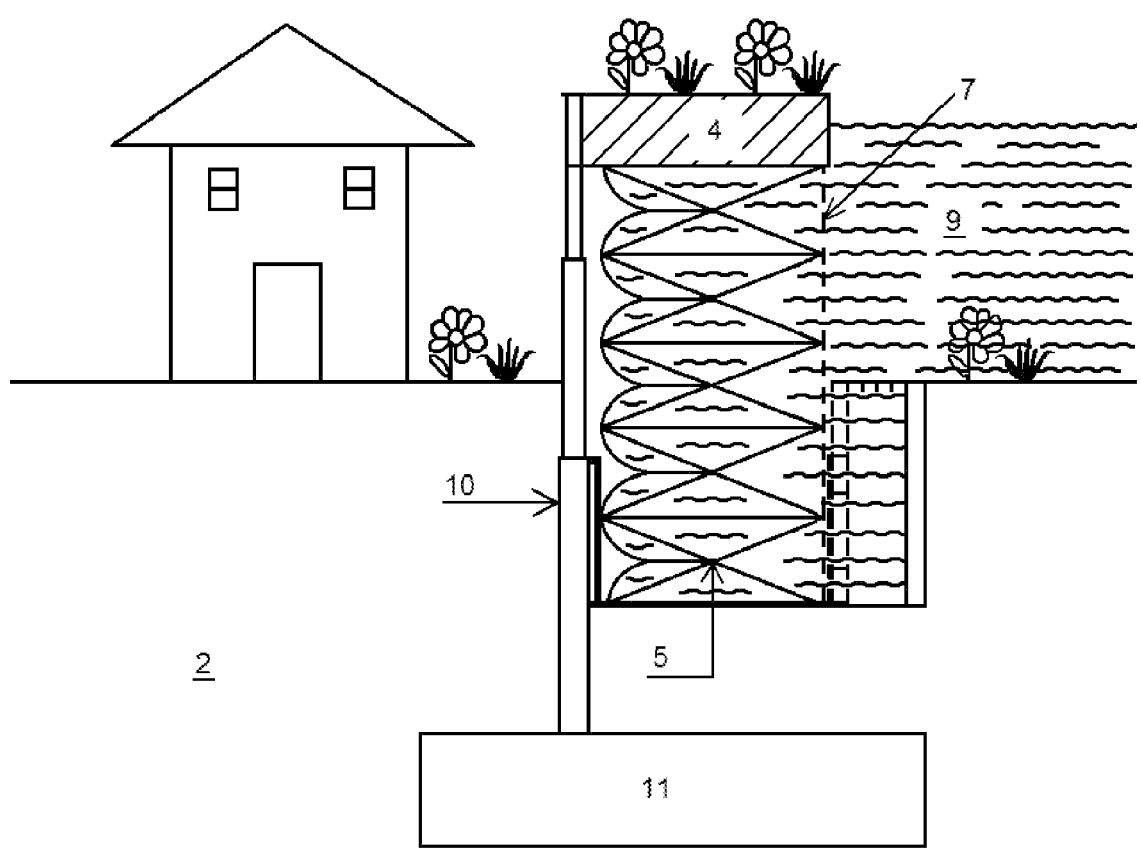
FIG. 4. The optional telescopic pivot posts providing additional stability to the dam.

Depending on a particular design and space available, there are several optional embodiments:
1. Depending on the expected maximal water level, the telescopic pivot posts (10) may be installed to provide a greater horizontal stability and firmness of the dam as shown in FIG. 4. The posts may have their own foundation (11) if necessary.
2. Depending on space available to build and store the floating bar of right volume, additional lifting force may be required. This can be provided by different driving mechanisms, such as, e.g., electric or hydraulic, helping to unfold the dam frame (5). The flood protection systems that use any other powered lifting mechanisms are called active, whereas the systems that use the buoyancy force only (no any other power source) are called passive. The preferable embodiment depicted in FIGS. 1-3 illustrates the passive system.
3. For the active systems, different sensors may be used (pressure sensors, remote optic or acoustic sensors, etc.) to track the level of approaching water and control the height of the raising dam.
4. The openings in the upper part of the drainage (1) may have a covering lid or valves to prevent the drainage compartment from contamination when the system is not in use. In this case, either a human or water sensor should be involved to open the lid or valves to allow water to reach into the drainage during flood.
5. Specific materials needed to build the claimed flood protection system are contingent on the specific location and the maximal expected water level.

It is important to understand that these or other modifications of the preferable embodiment do not constitute a basis for a separate patent because they are the same claimed invention contingent on specific installation conditions.

The present invention makes the following claims:
1. A flood-protection system for preventing flood waters from encroaching upon a building or property by intercepting flow across a ground surface, comprising:
   a dam compartment installed substantially below the level of the ground surface, the dam compartment having at least a first wall, a second wall and a floor, each wall having a top and a bottom portion;
   a flexible, impermeable barrier, having an upper edge and a lower edge;
   a foldable and vertically expandable frame apparatus, constructed to extend vertically without lateral displacement, having a top portion and a bottom portion and having an upstream and a downstream side; and
   a barrier extension means for at least one of lifting the upper edge of the barrier and vertically extending the frame apparatus;
   wherein
      the first wall and second wall are separated by the floor, to which floor each bottom portion of each wall is sealably attached,
      the first wall is positioned closer to the building or property to be protected than is the second wall, with the second wall being positioned between the first wall and the direction of the encroaching flood water,
      the frame apparatus is positioned within the compartment, its downstream side being proximate to the first wall and its upstream side being between the downstream side and the direction of the encroaching water,
      the barrier is sealably attached at its upper edge to the top portion of the frame apparatus on the downstream side of the frame apparatus, and
      the barrier is sealably attached at its lower edge to at least one of the floor proximate to the first wall and the lower portion of the frame apparatus on its downstream side,
   such that activation of the barrier extension means prevents flood waters that enter into the compartment over the second wall from crossing the barrier, thereby preventing flood waters from passing over the first wall.
2. The flood-protection system of claim 1, wherein the barrier extension means is autonomous and passive.
3. The flood-protection system of claim 1, wherein the barrier extension means is at least one of actively assisted by and actively powered by electricity, hydraulics or a force other than buoyancy alone.
4. The flood-protection system of claim 3, further comprising a sensor to at least one of track the level of approaching water and control the height of raising of the dam.
5. The flood-protection system of claim 1, wherein the barrier extension means comprises a floatable bar attached to at least one of the upper edge of the barrier and the upper portion of the frame apparatus on its downstream side, said bar operating to extend the barrier by flood water entering the dam compartment, lifting the bar by buoyant force, and thereby lifting the upper edge of the barrier and extending the frame apparatus.
6. The flood-protection system of claim 5, wherein the floatable bar is constructed from wood, synthetic foam, an air tank, or another material lighter than water.
7. The flood-protection system of claim 5, wherein the system is concealable underground when not in operation during a flood and the floating bar has covering soil and lawn vegetation gardened on the soil.
8. The flood-protection system of claim 1, wherein the barrier extension means further comprises one or more flexible links and the expandable frame apparatus further comprises pairs of telescoping cross-struts connecting stacked horizontal members, each cross-strut having a rigid outer member and a slideably inserted inner member, the ends of each cross-strut attached rotatably to fastening points attachable to opposing ends of the horizontal members, wherein the flexible link is attached to a portion of the barrier and to a point on the outer member of a cross-strut of the frame apparatus, the link imposing constraint upon lateral movement of the barrier at the point of attachment of the link to the barrier, said link operating to extend the barrier vertically by (a) flood water pushing vertically against the curving or sloping regions in the vertical profile of the barrier and (b) the link pulling against a cross-strut to produce, through geometrical leverage, vertical force against a horizontal member of the frame apparatus, thereby extending the frame apparatus and the barrier vertically.

9. The flood-protection system of claim 1, further comprising a partial covering lid over the dam compartment, the lid having drainage openings.

10. The flood-protection system of claim 9, wherein the drainage openings can be closed and reopened by operation of at least one of the covering lid and a valve, said operation being controllable by at least one of human action and a water sensor.

11. The flood-protection system of claim 1, further comprising the barrier is a flexible, impermeable material or flexibly joined impermeable plates.

12. The flood-protection system of claim 1, further comprising extendable pivot posts positioned between the material and the building or property, said posts attached to the floatable bar.

13. The flood-protection system of claim 1, further comprising a water permeable net or other water permeable material attached to the upstream side of the frame apparatus.

14. The flood-protection system of claim 13, further comprising the sensor is a pressure sensor, a remote optic sensor or an acoustic sensor.

15. A flood-protection method for protecting a building or property from flood waters encroaching across a ground surface, comprising the following steps:
    installing a dam compartment substantially below the ground surface between the building or property to be protected and the encroaching flood waters, the compartment having a first wall closest to the building or property, a second wall closest to the encroaching flood waters and a floor connecting the two walls;
    installing in the compartment an expandable and folding frame apparatus having an upper portion and a lower portion, the frame apparatus having a side closest to the first wall and an opposite side closer to the second wall;
    positioning between the frame apparatus and the first wall of the compartment a flexible impermeable barrier, the barrier having an upper edge and a lower edge;
    sealably attaching the lower edge of the barrier to at least one of (a) the floor of the compartment proximate to the first wall and (b) the lower portion of the frame apparatus on the side closest to the first wall;
    sealably attaching the upper edge of the barrier to the upper portion of the frame apparatus on the side closest to the first wall; and
    lifting the upper edge of the barrier, when flood water encroaches over the second wall of the dam compartment, to a height sufficient to prevent the rising flood waters from crossing the barrier, thereby protecting the building or property from flooding.

16. The flood-protection method of claim 15, wherein the step of lifting the barrier when flood water encroaches comprises the further steps of
    placing a floatable bar on top of the frame apparatus, and
    sealably attaching the bar to the upper edge of the barrier, wherein the force of buoyancy against the floatable bar from the encroaching flood waters lifts the bar and thereby prevents flood waters from crossing over the barrier.

17. The flood-protection method of claim 16, wherein the step of installing a dam compartment substantially below the ground surface further comprises the steps of
    installing beside the floatable bar at least a partial covering lid for the compartment on the side of the compartment closest to the encroaching flood waters, the lid having drainage openings,
    attaching a net or permeable material along the side of the frame apparatus closest to the second wall,
    optionally installing drainage openings in the lid that can be closed and reopened,
    optionally installing valves associated with closing and reopening the drainage openings,
    optionally installing sensors to activate the closing and reopening of the drainage openings or valves, the sensors triggerable by the presence or absence of encroaching flood waters, and
    optionally concealing below a soil layer the dam compartment, the frame apparatus, the bar and the barrier when there is not a flooding event.

18. The flood-protection method of claim 16, further comprising the step of installing extendable pivot posts positioned between the barrier and the building or property, said posts attached to the floatable bar.

19. The flood-protection method of claim 15, wherein the step of lifting the barrier further comprises attaching at least one flexible link between a portion of the barrier and a location on the frame apparatus, wherein the link imposes a constraint upon lateral movement of the barrier at the point of attachment of the link to the barrier and thereby assists the lifting of both the barrier and frame vertically by converting some of the flood water's horizontal force to a vertical force.

20. The flood-protection method of claim 15, wherein the step of lifting the barrier when flood water encroaches comprises the further step of at least one of (a) actively extending the barrier vertically by a driving mechanism powered by electricity, hydraulics or a force other than buoyancy and (b) assisting a passive extension of the barrier vertically by augmenting the lifting force by an active driving mechanism powered by electricity, hydraulics or a force other than buoyancy.

* * * * *